(No Model.)
B. B. SCHNEIDER.
CIGAR LIGHTER.
No. 243,980. Patented July 5, 1881.
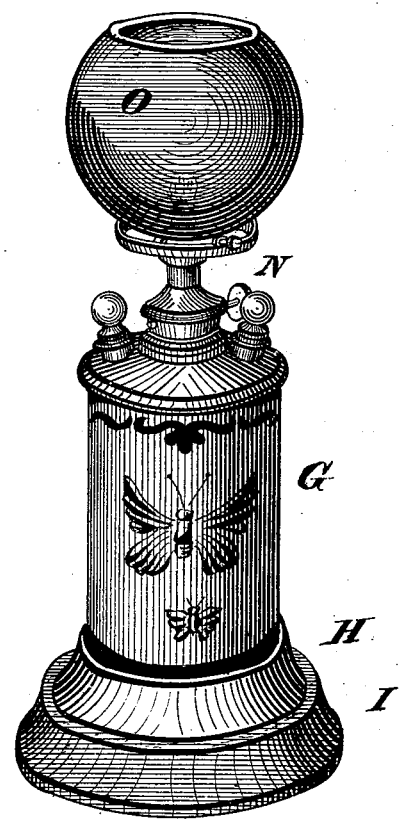
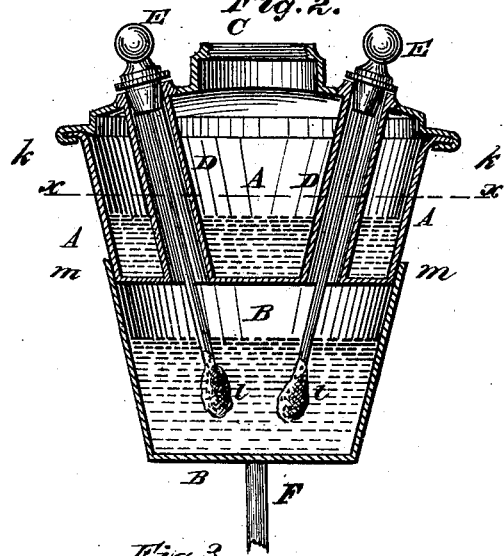
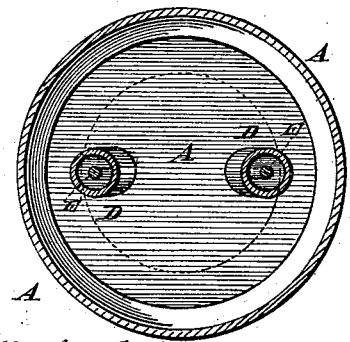
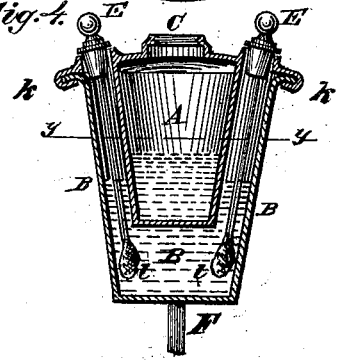
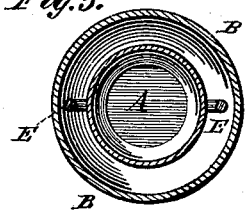
Witnesses:
P. C. Dietrich
Geo Binkenburg
Inventor:
Bennett B. Schneider
by his Attorney
Edwin S. Drake
N. PETERS, Photo-Lithographer, Washington, D. C.

UNITED STATES PATENT OFFICE.

BENNETT B. SCHNEIDER, OF ORANGE, NEW JERSEY.

CIGAR-LIGHTER.

SPECIFICATION forming part of Letters Patent No. 243,980, dated July 5, 1881.

Application filed February 24, 1881. (No model.)

*To all whom it may concern:*

Be it known that I, BENNETT B. SCHNEIDER, a citizen of the United States, residing at Orange, in the county of Essex and State of New Jersey, have invented certain new and useful Improvements in Cigar-Lighters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of lamps known to the trade as "cigar-lighters," and has for its object the production of a much more simple and compact device in construction, of more attractive appearance, equal efficiency in use, and at a reduced cost.

In the annexed drawings, forming part of this specification, Figure 1 shows an elevation, in perspective, of one style of my improved cigar-lighter. Fig. 2 shows a central vertical section of that part of Fig. 1 below the burner and inclosed in the vase G. Fig. 3 shows a plan view on the line $x\ x$ in Fig. 2. Fig. 4 shows a central vertical section of a variation in construction of the same part shown in Fig. 2; and Fig. 5 shows a plan view of Fig. 4 on the line $y\ y$.

Similar letters of reference denote corresponding parts in each of the figures.

A is the upper or oil fount, having tubes D passing through it from top to bottom, through which the torches E, having absorbent material $l$ at their lower ends, pass into the lower fount, B, in which the alcohol is contained.

C is the collar upon which the burner N is screwed, and O is a glass globe with a large opening at the top, which surrounds the flame of the lamp.

F is a rod (shown broken off in Figs. 2 and 4) which is secured to the bottom of the fount B. G is a vase, H a metal ring, and I a base.

$k$ is the projecting rim of the upper fount, A, and $m$ is the overlap by which the founts A and B are joined.

In making my cigar-lighter I first form a cup-shaped upper fount, A, terminating at its upper edge in an out-turned lip, and having holes in its bottom to receive the lower ends of the tubes D. I next form the top or cover of this fount, having upon its upper side the burner-collar C and the small collars, into which the upper ends of the tubes D enter. I then secure these parts—the fount and its cover—together, as shown at $k$, and having inserted the tubes D into the openings prepared to receive them, I solder carefully the ends of the tubes in their places and the joint at $k$. The tubes D are imperforate, having no openings in their sides which would permit any of the fluid passing through them, when filling the lower fount, to pass into the upper fount, and great care should be exercised in soldering these tubes where they pass through the bottom of the upper fount, to so solder them that there can be no leak around them of the contents of the upper fount into the lower. Then, forming the lower fount, B, similar in shape to the upper fount, A, but of such a size that the bottom of the upper fount shall fit closely within its upper part, as shown at $m$, Fig. 2, I solder the joint so made. I then solder on the rod F, which should be long enough to reach down through the base I, and should have a threaded portion at its lower end to receive a nut. I make the torches E, as shown in Fig. 2, by turning from a solid rod the stopper which fits the upper end of the tube D, and in this stopper I insert the wire, which, being split at the lower end, has the absorbent material $l$ secured in the cleft.

If, to complete my lamp, I desire to use a porcelain vase, G, I drill a hole centrally in the bottom of the vase large enough to permit the passage through it of the rod F, and a corresponding hole through the base I, and setting the lamp, Fig. 2, within the vase, the lip $k$ resting on the top edge of the vase, the rod F passes down through the hole in the bottom of the vase, through the metal ring H, and the hole in the base I, and I secure the whole firmly together by screwing on the nut, which draws the lip $k$ closely down upon the top of the vase. A polished-metal shell may be substituted for the porcelain vase, if desired.

I regard the novel feature of my device as being the arrangement of the separate reservoirs for the oil for the flame, and the alcohol for the torches, one above the other, and the provision made that the contents of the one may be reached through an inclosed passage through or immediately alongside the other.

I prefer to place the oil-fount uppermost, as thereby the wick of the lamp is better supplied, and the lower fount containing the alcohol is removed farther from the heat of the flame.

In the variation which I have shown in Figs. 4 and 5 the tube through which the torches pass to the fluid contained in the lower fount is formed by the walls of the two founts, and is an annular space surrounding the interior fount. I regard the two arrangements shown as substantially similar, the entrance to the lower fount being through the top of the upper.

I am aware that a construction similar to that shown in Figs. 4 and 5 has been used heretofore in a lamp, but for an entirely different purpose. I therefore do not claim it.

The upper fount might be provided with a central tube, to permit the passage of the wick into the lower fount, which would then be used as an oil-fount; but I prefer the arrangement I have shown, as more advantageous.

As the object of my invention is to provide a lamp with a receptacle for kerosene-oil or similar fluid, which may be kept constantly burning, and in immediate contiguity thereto a receptacle for alcohol for the saturation of the torches E, which, being withdrawn so saturated from this receptacle, may be lighted at the oil-flame, and afford an inodorous flame for lighting the cigar, it will, in the construction of any variation of my device, be necessary to so construct it that no mixture of the contents of the two founts can by any possibility occur, as it will be seen at once that a few drops, even, of the kerosene-oil from the upper fount reaching the contents of the lower fount the flame of the torches would no longer be inodorous, but would be vitiated by the odor of kerosene-oil, and would vitiate the cigar lighted from it.

Having thus described my invention, what I claim, and desire to secure by Letters Patent, is—

1. In a cigar-lighter, the combination of the two founts A and B, arranged the one above the other, and the imperforate tubes D, connecting the lower fount with the outer air, for the purpose set forth.

2. The combination, in a cigar-lighter, of the fount A with collar C, tubes D, torches E, the fount B, rod F, vase G, ring H, and base I, constructed substantially as described, and for the purpose set forth.

In testimony whereof I have affixed my signature in presence of two witnesses.

BENNETT B. SCHNEIDER.

Witnesses:
HALEY FISKE,
GEO. D. KURST.